United States Patent

Huang

[11] Patent Number: 5,677,492
[45] Date of Patent: Oct. 14, 1997

[54] DIAPHRAGM TYPE PRESSURE MEASURING DEVICE

[76] Inventor: Tien-Tsai Huang, No. 4-2, Lane 30, Wu Chuan St., Pan Chiao City, Taipei, Taiwan

[21] Appl. No.: 699,906

[22] Filed: Aug. 20, 1996

[51] Int. Cl.⁶ .................................................. G01L 7/08
[52] U.S. Cl. ................................................ 73/715; 116/272
[58] Field of Search ............................. 73/146.8, 715, 73/731; 116/34 R, 266, 272; 92/96, 97

[56] References Cited

U.S. PATENT DOCUMENTS

| | | | |
|---|---|---|---|
| 69,894 | 10/1867 | Beardslee | 73/715 |
| 1,197,196 | 9/1916 | Folberth | 73/731 |
| 1,694,286 | 12/1928 | Shorts | 73/715 |
| 2,417,449 | 3/1947 | Rubin | 73/731 X |
| 3,111,930 | 11/1963 | Zipper | 73/146.8 |
| 3,129,689 | 4/1964 | Henderson et al. | 116/34 R |
| 3,241,514 | 3/1966 | Grimland | 73/731 X |
| 3,452,708 | 7/1969 | Richardson | 116/34 R |
| 3,930,592 | 1/1976 | Dilanni | 116/266 X |
| 4,899,684 | 2/1990 | Houzvic et al. | 116/272 |
| 5,325,886 | 7/1994 | Klink | 116/34 R |

*Primary Examiner*—Richard Chilcot
*Assistant Examiner*—Paul D. Amrozowicz
*Attorney, Agent, or Firm*—Bacon & Thomas

[57] ABSTRACT

A diaphragm type pressure measuring device including a conical diaphragm having a top and a peripheral bottom edge, a pressure probe raised from the top of the conical diaphragm, a guard connected to the peripheral bottom edge of the conical diaphragm and disposed around the pressure probe and having an upright top flange raised from the periphery of a top rim thereof, and a cover adapted for covering on the upright top flange of the guard, wherein when an air pressure is applied to the conical diaphragm, the pressure probe is forced by the conical diaphragm to to cause a movement subject to the value of the applied air pressure.

7 Claims, 3 Drawing Sheets

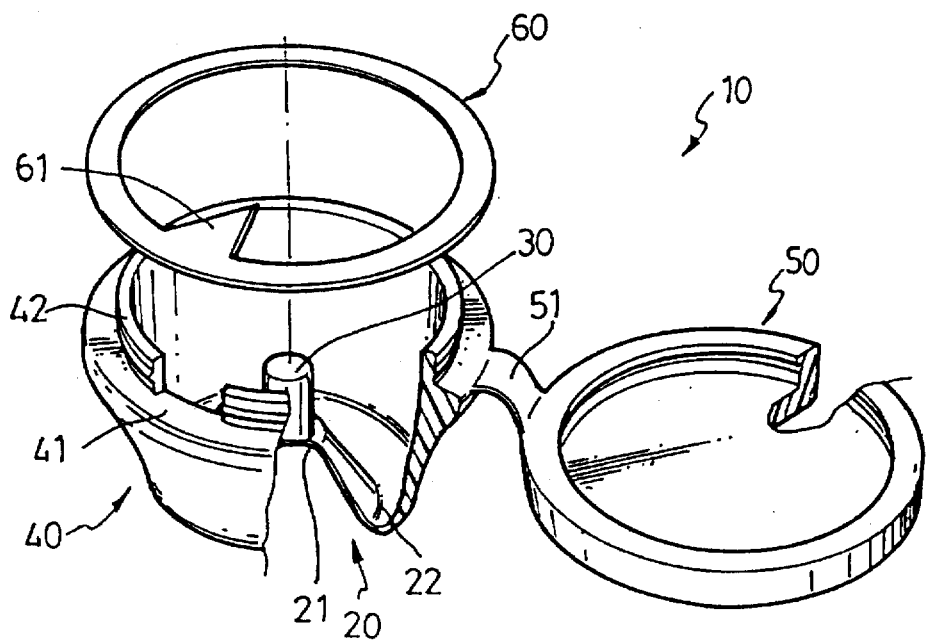
Fig. 1
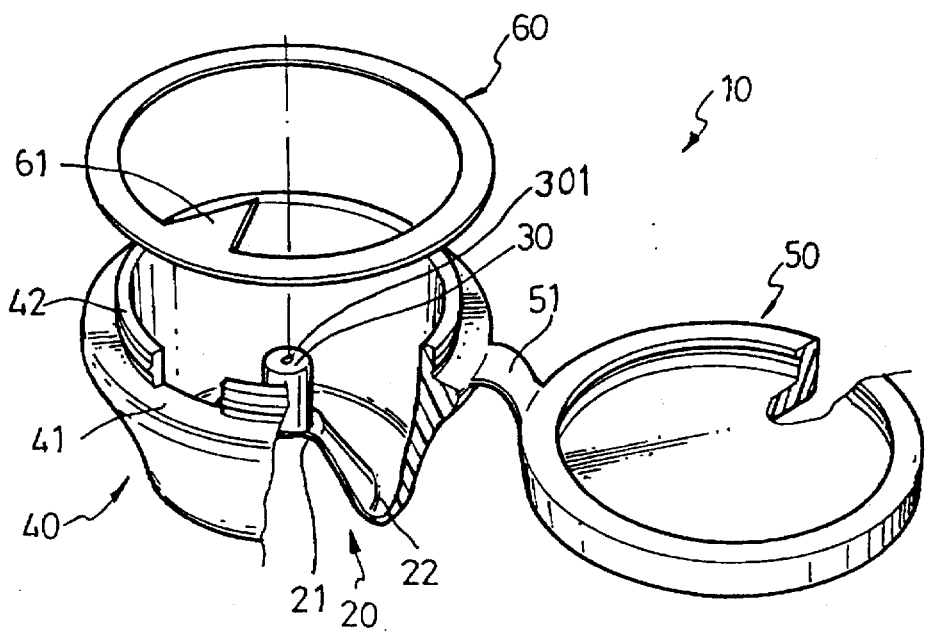
Fig. 1-A

DIAPHRAGM TYPE PRESSURE MEASURING DEVICE

BACKGROUND OF THE INVENTION

The present invention relates to pressure measuring devices, and relates more particularly to a diaphragm type pressure measuring device.

To measure the pressure of an air bag, a ball, an inflatable object, an air gage shall be used and fastened to the air valve of the object to be measured. However, air tends to leak from the measured object when the air gage is removed from the air valve, causing a measuring error. Furthermore, regular pressure gages cannot be directly bound to an inflatable object to monitor the change of its air pressure.

SUMMARY OF THE INVENTION

The present invention has been accomplished to provide a diaphragm type pressure measuring device which can be directly bound to an inflatable object to monitor the change of its air pressure. The diaphragm type pressure measuring device can be used in the air bag of the sole of a shoe, a life ring, the air bags of a mattress as well as any of a variety of inflatable balls such as a basketball, volleyball, football, etc. According to one aspect of the present invention, the diaphragm type pressure measuring device comprises a conical diaphragm having a top and a peripheral bottom edge, a pressure probe raised from the top of the conical diaphragm, a guard connected to the peripheral bottom edge of the conical diaphragm and disposed around the pressure probe and having an upright top flange raised from the periphery of a top rim thereof, and a cover adapted for covering the upright top flange of the guard, wherein when an air pressure is applied to the conical diaphragm, the pressure probe is forced by the conical diaphragm to cause a movement subject to the value of the applied air pressure. According to another aspect of the present invention, the conical diaphragm, the pressure probe, the guard, and the cover can be integrally molded from rubber, silicone rubber, or any of a variety of plastic materials.

BRIEF DESCRIPTION OF THE DRAWINGS

FIG. 1 is an exploded view of a diaphragm type pressure measuring device according to the first preferred embodiment of the present invention;

FIG. 1-A is an exploded view of a diaphragm type pressure measuring device according to the second preferred embodiment of the present invention;

DETAILED DESCRIPTION OF THE PREFERRED EMBODIMENT

Figure 2:
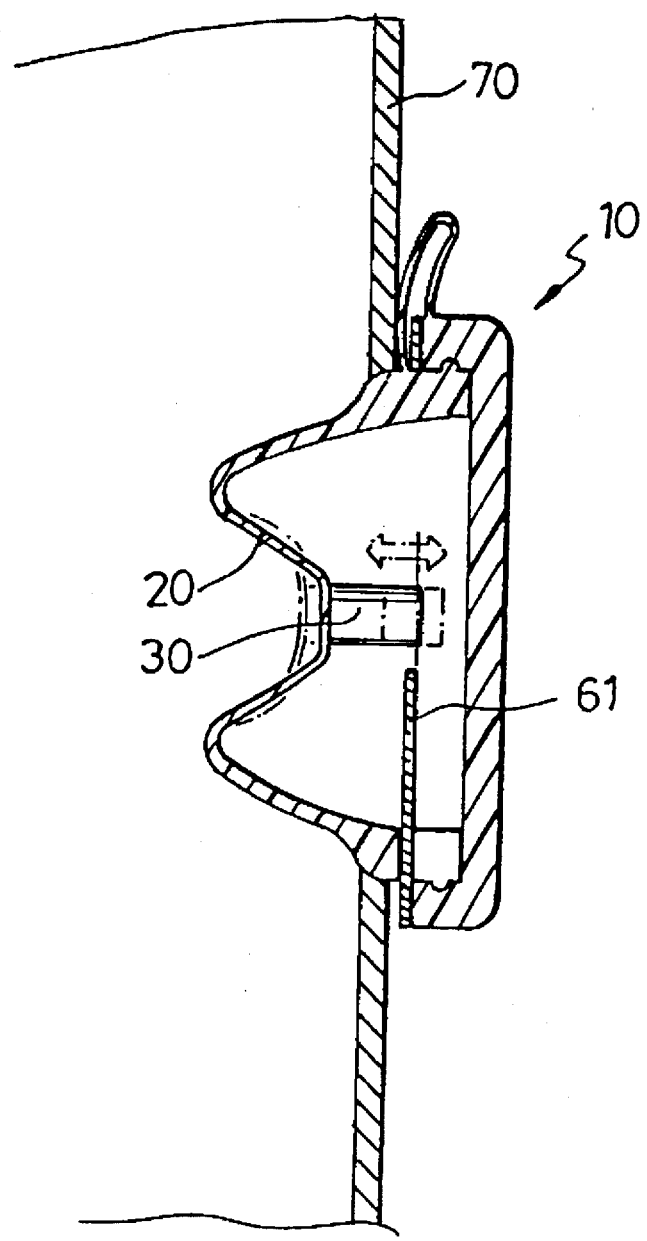
FIG. 2 is a sectional view of the present invention, showing the movement of the pressure probe.

Referring to FIG. 1, a diaphragm type pressure measuring device 10 in accordance with the first preferred embodiment of the present invention, is generally comprised of a conical diaphragm 20, a graduated pressure probe 30, a guard 40, and a cover 50. The pressure probe 30 is raised from the top 21 of the conical diaphragm 20. The guard 40 is connected to the periphery 22 of the conical diaphragm 20 to protect the conical diaphragm 20 and the pressure probe 30. The cover 50 is connected to the top rim 41 of the guard 40 by a flexible connecting strip 51, and adapted covering the upright top flange 42 of the guard 40.

Referring to FIG. 1 again, the top rim 41 is raised from the periphery of the guard 40 at the top, and the upright top flange 42 is raised from the top rim 41. An index ring 60 is mounted on the top rim 41 of the guard 40 around the top rim 41, having a pointer 61 aiming at the graduations of the graduated pressure probe 30.

Referring to FIG. 1-A, the second preferred embodiment of the present invention shows a multifunctional pressure probe 30. The pressure probe 30 in the the second embodiment is also a air valve itself. Therefore, the air can be pumped into an object from the air hole 301 of the pressure probe 30. For example, the original air valve of a basketball can be replaced by the present invention where the pressure probe 30 is also an air valve.

Referring to FIG. 2, when the diaphragm type pressure measuring device 10 is fastened to an inflatable object 70, the conical diaphragm 20 is forced by the air pressure of the inflated object 70 to expand, thereby causing the pressure probe 30 to move, and therefore the air pressure of the inflatable object 70 is measured. One graduation of the pressure probe 30 may be designated as a standard pressure value so that when the pressure of the inflatable object 70 is increased, the conical diaphragm 20 is forced to expand and to move the pressure probe 30 upwards relative to the pointer 61 of the index ring 60, and therefore the value of added air pressure is indicated; when the pressure of the inflatable object 70 is reduced, the conical diaphragm 20 is caused to contract and to move the pressure probe 30 downwards relative to the pointer 61 of the index ring 60, and therefore the value of reduced air pressure is indicated.

Figure 3:
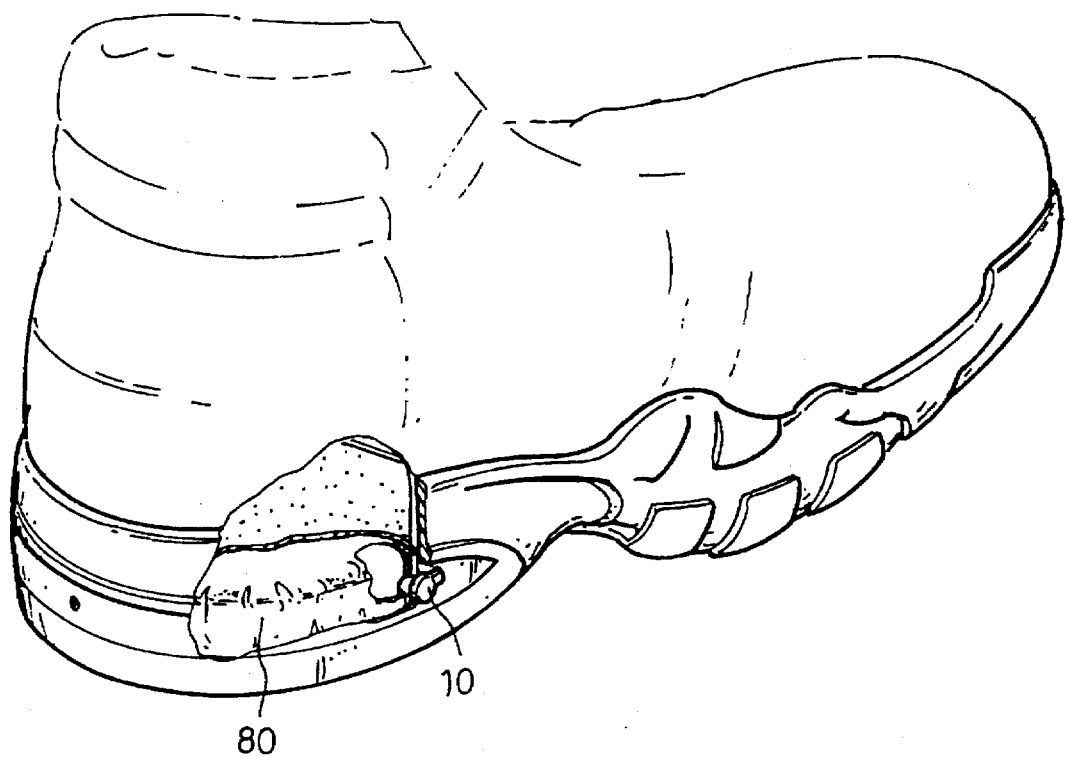
FIG. 3 is an applied view of the present invention, showing the diaphragm type pressure measuring device fastened to an air bag in the sole of a shoe.

FIG. 3 shows an application example of the present invention, in which the diaphragm type pressure measuring device 10 is fastened to an air bag 80 in the sole of a shoe to detect the air pressure of the air bag 80. When the air bag 80 bears the pressure of the user, the air pressure of the air bag 80 is caused to change. The change of the air pressure of the air bag 80 has a linear relationship with the body weight of the user. Therefore, the change of the user's body weight can be monitored through the diaphragm type pressure measuring device 10.

Figure 4:
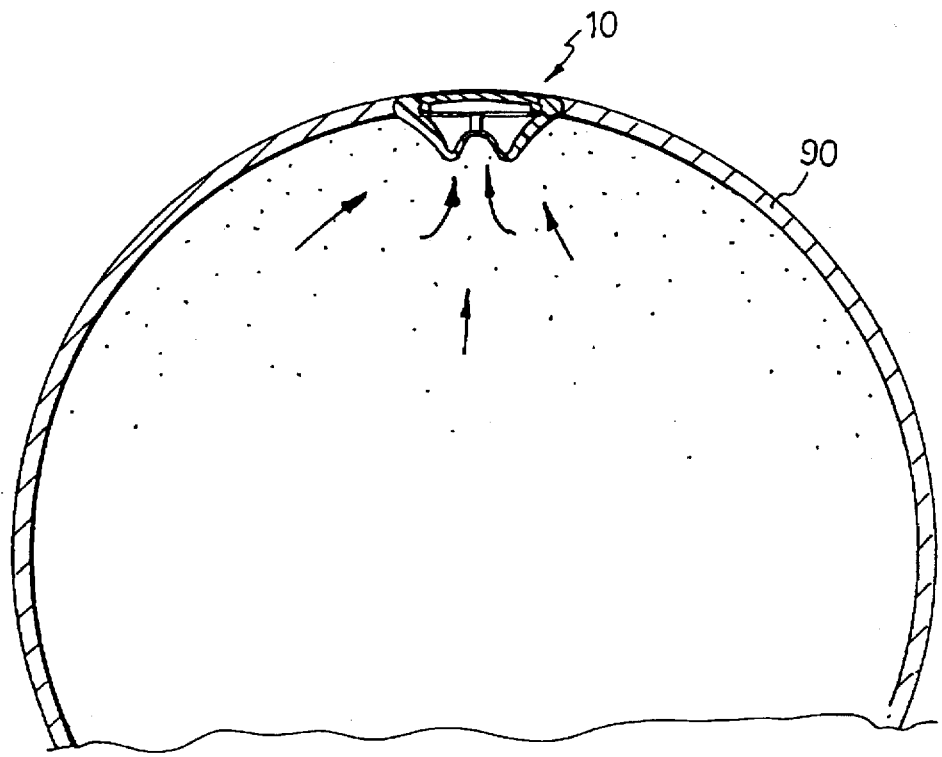
FIG. 4 is another applied view of the present invention, showing the diaphragm type pressure measuring device mounted in an inflatable ball.

FIG. 4 shows another application example of the present invention, in which the diaphragm type pressure measuring device 10 is directly coupled to an inflatable ball 90 to detect its normal air pressure. The diaphragm type pressure measuring device 10 and the inflatable ball 90 are integrally molded from the same material. Because the diaphragm type pressure measuring device 10 is tiny in comparison with the inflatable ball 90, it does not affect the structural strength and balancing of the inflatable ball 90.

It will be understood that the drawings are designed for purposes of illustration only, and are not intended as a definition of the limits and scope of the invention disclosed.

What the invention claimed is:

1. A diaphragm type pressure measuring device comprising:

a flexible conical diaphragm having a top and a peripheral bottom edge;

a pressure probe extending from the top of said conical diaphragm so as to undergo a range of movement with the conical diaphragm, the pressure probe having at least one graduation thereon;

a guard connected to the peripheral bottom edge of said conical diaphragm and disposed around said pressure probe, the guard having a top rim extending beyond the pressure probe on the conical diaphragm and an upright top flange raised from a periphery of the top rim thereof;

a cover removably attached to the upright top flange of said guard so as to be spaced from the pressure probe through its range of movement; and an index ring on the upright top flange of said guard, the index ring having a pointer pointing toward said pressure probe;

wherein when air pressure is applied to said conical diaphragm, said pressure probe is moved by said conical diaphragm proportional to the value of the applied air pressure.

2. The diaphragm type pressure measuring device of claim 1 wherein said conical diaphragm, said pressure probe, and said guard form an integral unit.

3. The diaphragm type pressure measuring device of claim 1 further comprising a connecting strip connecting said cover to the top rim of said guard.

4. The diaphragm type pressure measuring device of claim 1 further comprising a connecting strip connecting said cover to the top rim of said guard.

5. The diaphragm type pressure measuring device of claim 4 wherein the connecting strip is integrally formed with said top rim of said guard and said cover.

6. An air bag for a sole of a shoe having a diaphragm type pressure measuring device comprising:

a flexible conical diaphragm having a top and a peripheral bottom edge;

a pressure probe extending from the top of said conical diaphragm so as to undergo a range of movement with the conical diaphragm, the pressure probe having at least one graduation thereon;

a guard connected to the peripheral bottom edge of said conical diaphragm and disposed around said pressure probe, the guard having a top rim extending beyond the pressure probe on the conical diaphragm and an upright top flange raised from a periphery of the top rim thereof;

a cover removably attached to the upright top flange of said guard so as to be spaced from the pressure probe through its range of movement; and an index ring on the upright top flange of said guard, the index ring having a pointer pointing toward said pressure probe;

wherein when air pressure is applied to said conical diaphragm, said pressure probe is moved by said conical diaphragm proportional to the value of the applied air pressure.

7. An inflatable ball having a diaphragm type pressure measuring device comprising:

a flexible conical diaphragm having a top and a peripheral bottom edge;

a pressure probe extending from the top of said conical diaphragm so as to undergo a range of movement with the conical diaphragm, the pressure probe having at least one graduation thereon;

a guard connected to the peripheral bottom edge of said conical diaphragm and disposed around said pressure probe, the guard having a top rim extending beyond the pressure probe on the conical diaphragm and an upright top flange raised from a periphery of the top rim thereof;

a cover removably attached to the upright top flange of said guard so as to be spaced from the pressure probe through its range of movement; and an index ring on the upright top flange of said guard, the index ring having a pointer pointing toward said pressure probe;

wherein when air pressure is applied to said conical diaphragm, said pressure probe is moved by said conical diaphragm proportional to the value of the applied air pressure.

\* \* \* \* \*